(12) United States Patent
Persson et al.

(10) Patent No.: US 8,924,686 B2
(45) Date of Patent: Dec. 30, 2014

(54) MEMORY MANAGEMENT UNIT

(75) Inventors: Erik Persson, Lund (SE); Ola Hugosson, Lund (SE); Andreas Björklund, Lund (SE)

(73) Assignee: ARM Limited, Cambridge (GB)

( * ) Notice: Subject to any disclaimer, the term of this patent is extended or adjusted under 35 U.S.C. 154(b) by 818 days.

(21) Appl. No.: 12/588,263

(22) Filed: Oct. 8, 2009

(65) Prior Publication Data
US 2011/0087858 A1    Apr. 14, 2011

(51) Int. Cl.
G06F 12/00 (2006.01)
G06F 9/26 (2006.01)
G06F 9/34 (2006.01)
G06F 12/10 (2006.01)

(52) U.S. Cl.
CPC ................... *G06F 12/1027* (2013.01)
USPC .......................................................... 711/216

(58) Field of Classification Search
None
See application file for complete search history.

(56) References Cited

U.S. PATENT DOCUMENTS

| | | | | |
|---|---|---|---|---|
| 6,079,004 A | * | 6/2000 | Liedtke ......................... | 711/207 |
| 2002/0062434 A1 | * | 5/2002 | Chauvel et al. ............... | 711/207 |

OTHER PUBLICATIONS

Handy, Jim, the Cache Memory book, Academic Press, 2nd edition, pp. 51-63.*
Wikipedia, Hash Function, retrived from http://en.wikipedia.org/wiki/Hash_function on Oct. 18, 2012, Wikipedia, 9 pages.*
Shalan et al., "A Dynamic Memory Management Unit for Embedded Real-Time System-on-a-Chip", *CASES '00*, Nov. 2000, pp. 180-186.
C. McNairy, "Hyper-Threading on Dual Core Intel® Itanium® 2 Processors", *Intel Corporation*, 2006, 12 pages.
Technical Overview PrimeCell® Infrastructure AMBA™ 3 TrustZone™ Protection Controller (BP147) Revision: r0p0, *ARM Limited*, 2004, pp. 1-18.

* cited by examiner

*Primary Examiner* — April Y Blair
*Assistant Examiner* — Gary W Cygiel
(74) *Attorney, Agent, or Firm* — Nixon & Vanderhye P.C.

(57) ABSTRACT

A data processing apparatus is provided comprising a plurality of master devices configured to issue memory access requests including virtual addresses. A memory management unit is configured to receive memory access requests and to translate a virtual address included in a memory access request from a requesting master device into a physical address indicating a storage location in memory. The memory management unit has an internal storage unit having a plurality of entries wherein indications of corresponding virtual address portions and physical address portions are stored. The memory management unit is configured to select an entry of the internal storage unit in dependence on the virtual address and an identifier of the requesting master device. Conflict between the master devices in their usage of the internal storage unit is thus avoided.

25 Claims, 5 Drawing Sheets

MEMORY MANAGEMENT UNIT

TECHNICAL FIELD

The technology relates to memory management devices, and more particularly, to memory management devices receiving memory access requests from multiple master devices.

BACKGROUND

It is known in data processing apparatuses to arrange the storage of data in memory in a page mapped manner, wherein page tables stored in external memory provide a translation between virtual addresses used by a program running in the data processing apparatus and physical addresses of data in external memory. A memory management unit (MMU) is typically provided to administer these translations. Using page mapped memory for a master device in a system through a MMU has the advantage of allowing its operation to be integrated with the memory management of the operating system and enables memory protection shielding from one application to another.

The MMU is normally arranged to have an internal storage unit in which a cached subset of all possible translations between virtual and physical addresses is stored. A typical example of such an internal storage unit is a translation lookaside buffer (TLB). When the MMU receives a memory access request from a master device in the data processing apparatus, it references its TLB to establish if an entry corresponding to that virtual address is currently stored therein. If it is, then the MMU translates the virtual address into the corresponding physical address using the information in the TLB entry and the memory access request is carried out using that physical address. If however an entry corresponding to the requested virtual address is not stored in the TLB, then the MMU initiates a "page walk" process in which a page table stored in external memory is referenced to find the virtual address. A replacement entry for that entry of the TLB is retrieved from the page table (consisting of an indication of the virtual address to physical address translation and, typically, some other permission information). The physical address in memory is then accessed.

It is further known for a data processing apparatus to comprise multiple master devices which can issue memory access requests including virtual addresses that require translation into corresponding physical addresses. Such a multi-master device may only provide a single MMU (comprising a single TLB). Such a shared MMU/TLB has the advantage of occupying a limited area on a system-on-chip (SoC) device. However, such an arrangement also has the drawback that the activities of one master device may adversely affect the performance of another master device, for example where a TLB entry commonly used by one master is the same as a commonly used TLB entry for another master. The thrashing that then results due to each master repeatedly replacing that TLB entry can be a serious performance limitation.

One known mechanism for identifying TLB entries in a system having multiple masters is the addition of an extra bit in each TLB entry indicating the master to which that TLB entry belongs. Whilst such an arrangement can enable the MMU to keep track of which TLB entries are associated with which master devices, the above described problem of thrashing between different masters using the same TLB entry can still occur. Furthermore this approach necessarily increases the size of each TLB entry.

It would be desirable to provide an improved technique for the configuration of a memory management unit servicing a number of master devices.

SUMMARY

A first aspect provides a data processing apparatus comprising: a plurality of master devices configured to issue memory access requests including virtual addresses; and a memory management unit configured to receive said memory access requests and to translate a virtual address included in a memory access request from a requesting master device into a physical address indicating a storage location in memory, said memory management unit having an internal storage unit having a plurality of entries wherein indications of corresponding virtual address portions and physical address portions are stored, said memory management unit being configured to select a selected entry of said internal storage unit in dependence on said virtual address, wherein said memory management unit is configured, if a virtual address portion stored in said selected entry does not correspond to said virtual address, to retrieve from a page table stored in memory a replacement entry corresponding to said virtual address, said memory management unit further comprising an index generation unit configured to generate an index into said internal storage unit to select said selected entry in dependence on said virtual address and an identifier of said requesting master device.

A memory management unit is provided to translate virtual addresses included in memory access requests into corresponding physical addresses indicating a storage location in memory. The memory management unit is arranged to have an internal storage unit having a plurality of entries in which indications of corresponding virtual address portions and physical address portions are stored. This memory management unit services memory access requests issued by a plurality of master devices and in particular, when the memory management unit receives the memory access request from one of those master devices, it is configured to select an entry of its internal storage unit in dependence not only on the virtual address included in that memory access request, but also in dependence on an identifier of the requesting master device. This configuration enables the usage of the entries in the internal storage unit to be varied in dependence on the master device issuing the memory access request. Hence, the performance of each master device (in terms of how its memory access requests are handled by the memory management unit) can be controlled in dependence on how the index generation unit is set up.

The usage of the entries of the internal storage unit could be arranged in a variety of ways, but in one embodiment said index generation unit is configured to generate said index such that at least a subset of said plurality of entries of said internal storage unit are uniquely associated with one of said plurality of master devices. This configuration ensures that the at least one subset of entries in the internal storage unit which the memory management unit reserves for a given master device does not overlap with those used in association with any of the other master devices. Hence, the performance of that master device (in terms of how its memory access requests are handled by the memory management unit) will not be adversely affected by the fact that the memory management unit and internal storage unit are shared with other master devices.

In one embodiment, said index generation unit is configured to generate said index such that each entry of said internal storage unit is uniquely associated with one of said plurality of master devices. Arranged like this the advantages associated with reserving internal storage unit entries for a given master device are extended to all entries of the internal storage unit.

The index generation unit could take a variety of forms, but in one embodiment said index generation unit is comprised within an arbiter unit configured to arbitrate between said memory access requests issued by said plurality of master devices. The memory management unit is configured to handle memory access requests from a plurality of master devices, and hence it is advantageous to provide an arbiter unit which arbitrates between memory access requests issued by different master devices. For example the arbiter unit can be configured to prioritise memory access requests from a particular master device.

There is a variety of ways in which the index into the internal storage unit could be generated, but according to one embodiment said index generation unit is configured to generate said index into said internal storage unit using a hash function. The use of a hash function by the index generation unit enables the memory management unit to translate the virtual address and identifier of the requesting master device into an index of a predetermined size appropriate for selecting one entry out of the plurality of entries in the internal storage unit.

Depending on the system requirements, the hash function employed by the index generation unit to generate the index into the internal storage unit could be the same for all master devices, but according to one embodiment the hash function is different depending on the requesting master device. In particular, this enables the manner in which entries in the internal storage unit are used by a given master device to be controlled by the system designer. Furthermore, the use of a different hash function for each requesting master device provides one mechanism which enables the number of entries in the internal storage unit allocated to each master device to be determined by the system designer. For example, a master device which only accesses a limited range of data may only require a small set of entries in the internal storage unit (e.g. 8), whilst another master device which handles large data sets could require many more entries in the internal storage unit (e.g. 128). One example of a master device requiring access to a large data set is a DMA controller transferring pixel data (e.g. 3 MB video frame buffers) within a video data processing apparatus.

A hash function associated with each master device could be arranged in a variety of ways to provide different sets of entries in the internal storage unit to be associated with each master device. In one embodiment a number of bits of said virtual address used in said hash function is dependent on said requesting master device. Arranging the index generation unit in the memory management unit to vary the number of bits used from the virtual address depending on the master device issuing the memory access request provides one mechanism by which the set of entries allocated to that master device can be varied.

In one embodiment, said index generation unit is configured to generate said index by applying said hash function to at least a portion of said virtual address to generate a first portion of said index, and by using said identifier of said requesting master device to generate a second portion of said index, and by adding said first portion to said second portion to generate said index. Generating the index in this manner provides an advantageously flexible mechanism for allocating particular entries to a given master device.

In one embodiment, the memory management unit is further configured, if said virtual address portion stored in said selected entry does not correspond to said virtual address, to generate a further index into said internal storage unit using a further hash function to reselect said selected entry in dependence on said virtual address and said identifier of said requesting master device. Using a second hash function in this way provides a second opportunity to find the required address translation in the internal storage unit and thus to make greater use of the internal storage unit (hence avoiding a fetch from the page table in memory). If this second selected entry also does not correspond to the virtual address, the replacement entry can be allocated to one of the two entries selected, say, alternately or pseudo-randomly.

In one embodiment the index generation unit comprises a lookup table configured to store for each identifier a base index, said index being generated in dependence on said base index. Such a lookup table is an easily configurable mechanism for translating a master identifier into a base index. The base index can for example represent the lowest order index available to that master.

In embodiments the lookup table is further configured to store for each identifier an index range, said index being generated within a range specified by said base index and said index range. This provides a convenient mechanism for specifying the range of indexes that may be generated by the index generator for a given master, for example from a lower order index at the base index, to a higher order index given by the sum of the base index and the index range.

In embodiments the lookup table is further configured to store for each identifier a hash function indicator, said hash function indicator being indicative of said hash function to be used to generate said index. This provides a mechanism not only for the hash function to be selected in dependence on the master, but also can provide a mechanism for the hash function itself to define the range of index values that may be generated for each master device.

In the event that the virtual address portion stored in the selected entry in the internal storage unit does not correspond to the virtual address in the memory access request, the memory management unit is configured to retrieve a replacement entry from a page table stored in memory. In one embodiment, the memory management unit is configured to access said page table using a physical base address stored in a register. Having this physical base address stored in register accessible to the memory management unit provides an easily configurable mechanism for selecting the appropriate portion of the page table in memory. An alteration of the configuration of the page table can be reflected by the simple means of storing a different physical base address in that register. Whilst one page table could in principle be fully shared by the masters, in one embodiment said memory management unit is configured to access said page table using a master-specific physical base address stored in a master-specific register associated with said requesting master device. This arrangement enables a specific section of the page table in memory to be selected for each master, and furthermore for the selection of that section of the page table to easily reconfigured.

In providing translations between virtual addresses and physical addresses, it may be that the memory management unit is called upon to repeatedly perform the same translations in sequence for one of the master devices. For example, if a master device issues memory access requests to a sequence of addresses contained within a single page in memory, then the same virtual to physical address translation will be performed for each of those accesses with respect to the non-page table bits of the address. In such a situation it is therefore advantageous to provide a cached subset of the entries of the internal storage unit in order to more quickly perform these translations. Hence, in one embodiment said memory management unit further comprises at least one subset storage unit configured to cache a subset of said entries, wherein if said virtual address corresponds to a virtual address portion cached in said subset, said memory management unit is configured to translate said virtual address into said physical address using a corresponding physical address portion stored in said subset. It will be recognised that the storage policy for this subset storage unit could be selected according to various different schemes, but in one embodiment said at least one subset storage unit is configured to store the most recently used entries of said internal storage unit. It will also be recognised that the performance of such a subset storage unit is a trade off between size and speed, and in one embodiment said at least one subset storage unit is configured to store up to three entries. A subset storage unit configured to store up to three entries has been found to provide a cost effective balance of this trade off.

Whilst a subset storage unit could be shared between the master devices in the manner in which the internal storage unit of the memory management is, in one embodiment said memory management unit comprises at least one subset storage unit for each master device. Having a subset storage unit uniquely associated with each master device provides improved performance in terms of the speed with which a translation can be performed for that master device, regardless of the activity of the other master devices. As a further level of refinement, in one embodiment, said memory management unit comprises a subset storage unit associated with a predetermined activity of each master device. Having a subset storage unit associated with a particular activity of a master device ensures that address translations required by particular activities enhances the performance of the data processing system, since when switching between activities a given master device will not have to wait for translations associated with a new activity to be retrieved from a page table in external memory if those translations are already cached.

The internal storage unit of the memory management unit can be set up to store its entries in a variety of ways but in one embodiment said internal storage unit is configured to store said entries in a direct mapped fashion. In another embodiment said internal storage unit is configured to store said entries in a set-associative fashion.

The technology may find applicability in various data processing apparatuses, but in one embodiment said data processing apparatus is a video data processing apparatus. A video data processing apparatus represents a system in which some masters such as DMA controllers transferring pixel data will require access to a large data set, whilst other masters will only access a limited range of data. As such, the protection that the technology in this application affords to the performance of such masters with different data access requirements are of particular benefit.

The index generation unit of the memory management unit could be set up in a variety of ways. In one embodiment the configuration of said index generation unit is predetermined. Alternatively in another embodiment the configuration of the index generation unit is programmable. This enables the usage of the memory management unit to be optimised, depending in the current activity of the data processing apparatus. When the index generation unit is programmable, in one embodiment said index generation unit has at least one register associated therewith for storing configuration data. This facilitates the programming of configuration data for the index generation unit.

The internal storage unit of the memory management unit could be provided by a range of physical embodiments, but in one embodiment the internal storage unit is an SRAM device.

A second aspect provides a data processing apparatus comprising: a plurality of master device means for issuing memory access requests including virtual addresses; and a memory management means for receiving said memory access requests and for translating a virtual address included in a memory access request from a requesting master device means into a physical address indicating a storage location in memory, said memory management means having internal storage means having a plurality of entries for storing indications of corresponding virtual address portions and physical address portions, said memory management means being configured to select a selected entry of said internal storage means in dependence on said virtual address, wherein said memory management means is configured, if a virtual address portion stored in said selected entry does not correspond to said virtual address, to retrieve from a page table stored in memory a replacement entry corresponding to said virtual address, said memory management means further comprising index generation means for generating an index into said internal storage means to select said selected entry in dependence on said virtual address and an identifier of said requesting master device means.

A third aspect provides a method of operating a data processing apparatus comprising the steps of: issuing memory access requests including virtual addresses from a plurality of master devices; receiving said memory access requests at a memory management unit; translating a virtual address included in a memory access request from a requesting master device into a physical address indicating a storage location in memory, said memory management unit having an internal storage unit having a plurality of entries wherein indications of corresponding virtual address portions and physical address portions are stored; selecting a selected entry of said internal storage unit in dependence on said virtual address, wherein, if a virtual address portion stored in said selected entry does not correspond to said virtual address, retrieving from a page table stored in memory a replacement entry corresponding to said virtual address; and generating an index into said internal storage unit to select said selected entry in dependence on said virtual address and an identifier of said requesting master device.

DESCRIPTION OF NON-LIMITING EXAMPLE EMBODIMENTS

Figure 1:
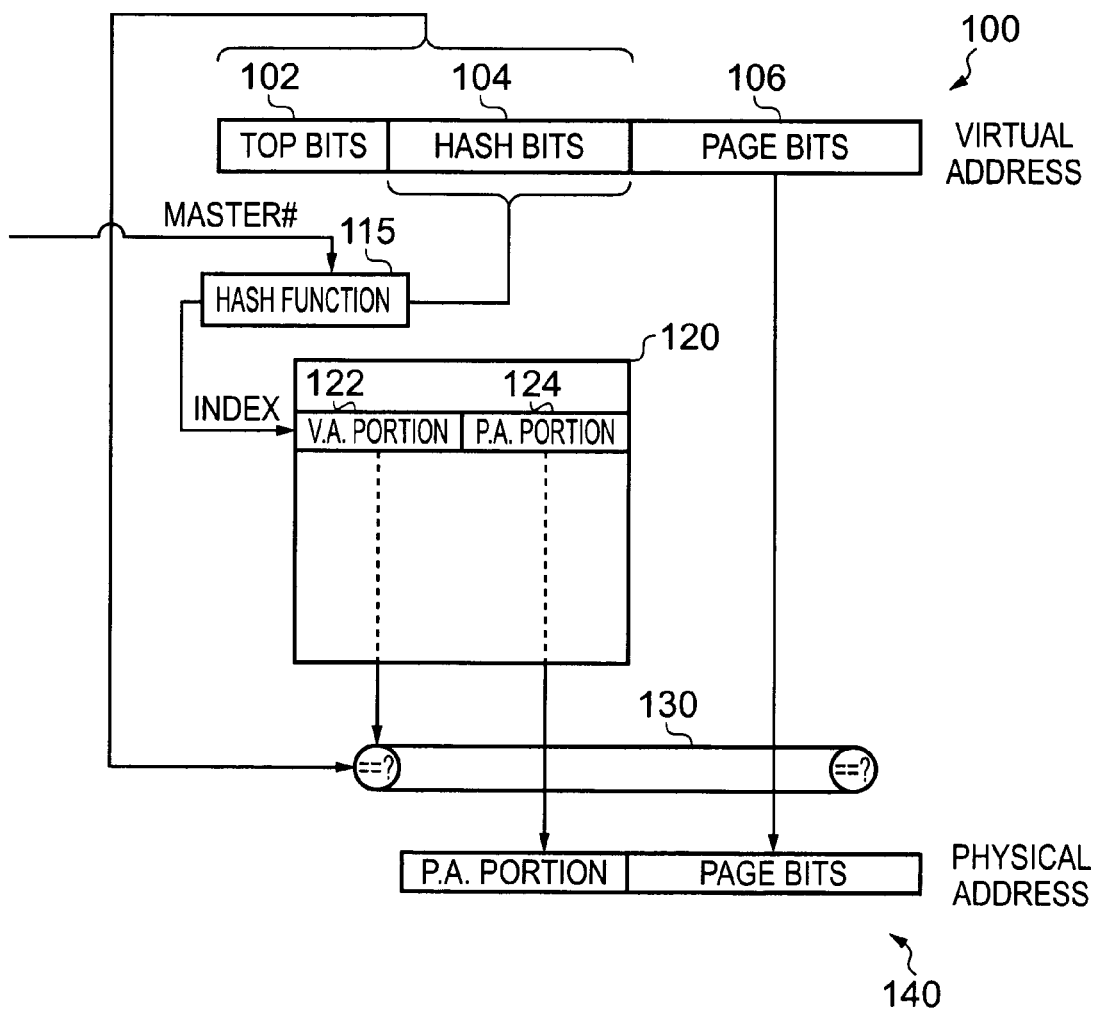
FIG. 1 schematically illustrates the translation of a virtual address into a physical address.

FIG. 1 schematically illustrates the translation of a virtual address into a physical address as is carried out by a memory management unit. Virtual address 100 can be seen to be composed of top bits 102, hash bits 104 and page bits 106. Within the memory management unit it is the hash bits 104 which are taken by the arbiter unit (not explicitly illustrated), together with an identifier of the master device which has issued the memory access request containing virtual address 100, to generate an index into the internal storage unit 120, by means of hash function 115. The internal storage unit 120 has a plurality of entries in which corresponding virtual address portions 122 and physical address portions 124 are stored. The storage of data in this plurality of entries in the illustrated embodiment is carried out in a direct mapped fashion. In an alternative embodiment the data are stored in a set associative fashion.

The top bits 102 and hash bits 104 of virtual address 100 are compared by comparator 130 with the virtual address portion 122 stored in the entry of the internal storage unit 120 which has been identified by the index generated by hash function 115. If they match, then the physical address portion 124 stored in that entry is combined with the page bits 106 to form physical address 140, which is then used to access a location in memory. On the other hand, if comparator 130 does not find a match, then a page table fetch unit is employed to access a page table in memory to retrieve a replacement entry for that entry of the internal storage unit 120 (see below).

Figure 2:
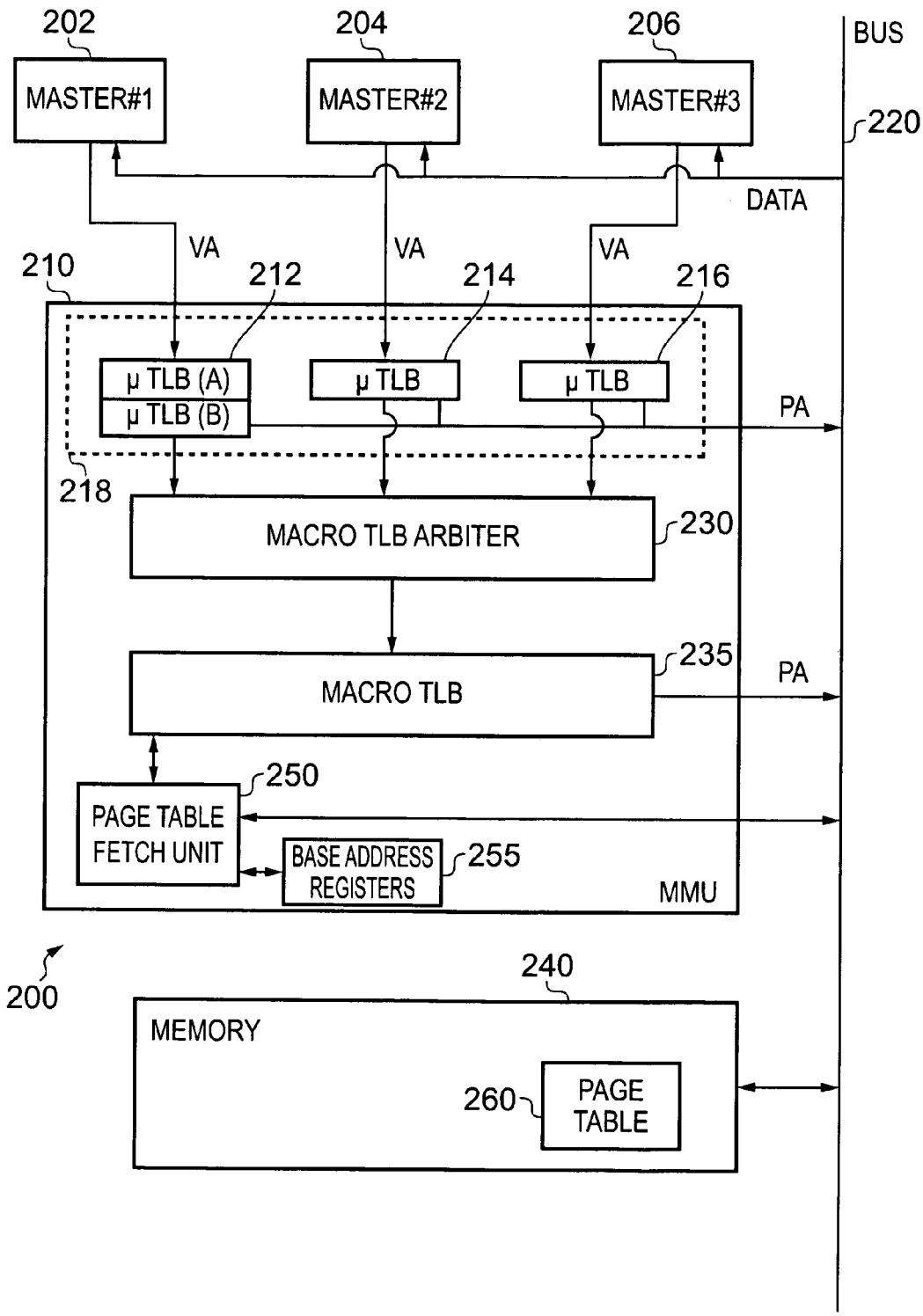
FIG. 2 schematically illustrates a data processing apparatus in one embodiment.

FIG. 2 schematically illustrates a data processing apparatus according to one embodiment. The data processing apparatus 200 in this embodiment is a video data processing apparatus and comprises a plurality of master devices 202, 204 and 206. Each of these master devices is connected to memory management unit 210 and to system bus 220. Each master device is configured to issue memory access requests including virtual addresses (VA) which are passed to the memory management unit 210. Associated with each master device in the memory management unit 210 is a micro TLB unit 212, 214 and 216 respectively. The memory management unit 210 further comprises a macro TLB arbiter 230 and a macro TLB 235. Macro TLB 235 is a SRAM device. The data processing apparatus 200 also comprises memory 240 connected to the system bus 220.

In operation, one of the master devices 202, 204 and 206 issues a memory access request including a virtual address which is received by memory management unit 210. The virtual address in the memory access request is first passed to the micro TLB 212, 214 and 216 corresponding to the master device to determine if the virtual address to physical address translation can be carried out on the basis of an entry cached therein. If it can, then the physical address thus generated is passed to system bus 220 and the data stored at that physical address in memory 240 is returned on system bus 220 to the corresponding master 202, 204 or 206 respectively. The illustrated micro TLBs are each arranged to cache the three most recently used TLB entries. If the corresponding micro TLB cannot perform the translation, then the virtual address is passed to macro TLB arbiter 230. The macro TLB arbiter 230 is configured to arbitrate between memory access requests from the different masters (and to prioritise between them when memory access requests arrive together from separate master devices) and to generate an index into macro TLB 235. This index generation is performed on the basis of the virtual address and a identifier of the master device that has issued that memory access request. Note that macro TLB 230 can identify the master issuing the request in this embodiment by virtue of the path over which it receives the virtual address.

An entry in macro TLB 235 is identified by the index generated by macro TLB arbiter 230. If the virtual address portion stored therein does not correspond to the virtual address issued by the master device, then the memory management unit is configured to use page table fetch unit 250 to perform a page table walk to access page table 260 in memory 240 in order to retrieve a replacement entry for that entry of macro TLB 235. Page table fetch unit 250 accesses page table 260 with reference to base address registers 255 in order to select the portion of the page table associated with the master device that has issued this memory access request. Once the entry in the macro TLB 235 corresponds to the virtual address in the memory access request, then the corresponding physical address is generated and passed onto bus 220 in order to access that physical location in memory 240. The data retrieved is then passed back over system bus 220 to the master which issued the request.

Alternative embodiments are also illustrated by the dashed lines in FIG. 2. In one embodiment the master devices all share a single micro TLB, indicated by the dashed line 218. In another embodiment, micro TLB 212 is subdivided into two micro TLBs 212A and 212B, each associated with a particular data processing activity of master 202.

Figure 3:
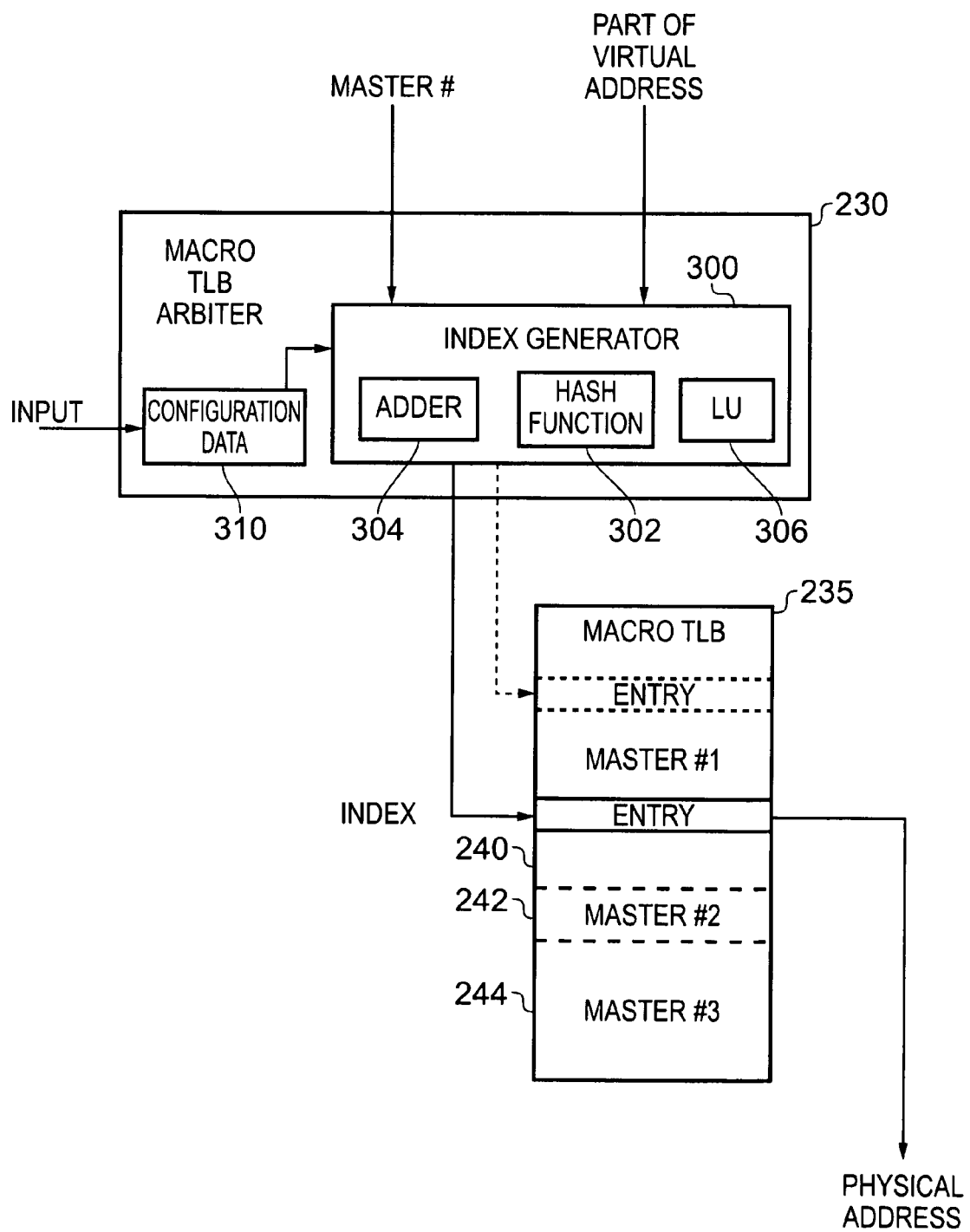
FIG. 3 schematically illustrates an arbiter unit generating an index into an internal storage unit in one embodiment.

FIG. 3 schematically illustrates the operation of the macro TLB arbiter 230 and macro TLB 235 illustrated in FIG. 2. Macro TLB arbiter 230 comprises a index generator 300 which generates the index which will select a particular entry in macro TLB 235. Conceptually, the two pieces of information required by index generator 300 are an identifier of the requesting master device (master #) and a part of the virtual address. In some embodiments both the identifier of the requesting master device and the part of the virtual address could be hashed by the hash function 302 in index generator 300, but in the illustrated embodiment hash function 302 operates on the received part of the virtual address and the result is added (using adder 304) to a base index retrieved from lookup table 306 (using the identifier of the requesting master device) to form the index. Operation of the lookup table 306 is described below with reference to FIG. 4.

In this embodiment the macro TLB arbiter 230 also comprises a configuration data unit 310 which determines the operation of the arbiter unit and in particular the operation of index generator 300. The configuration data stored in configuration data unit (register) 310 can be programmed as required by the system user. In other embodiments it could be predetermined (i.e. hardwired). For example the system designer can set up the configuration data such that the hash function performed differs for each master device. One way of doing this is to vary the number of bits of the virtual address that are used in the hash function, depending on the master device.

Note an alternative configuration (dashed line) is illustrated in FIG. 3, in which index generator 300 is configured to generate (from the same virtual address and master #) two different indexes (by means of two distinct hash functions) which can index into macro TLB 235. This functionality can be provided to allow greater use of the macro TLB, whereby if the first indexed entry does not match, the second indexed entry can be checked.

As can be seen in FIG. 3, macro TLB 235 is subdivided into regions associated with each of the master devices. Region 240 is associated with master 202, region 242 is associated with master 204, and region 244 is associated with master 206. This association of regions of the macro TLB with master devices is not a physical property of the macro TLB, but is provided for by the operation of the index generator 300 in macro TLB arbiter 230. Alternatively, only region 240 could be allocated to a specific master (namely master 202) to ensure it has unique access to those entries, whilst regions 242 and 244 could be shared by masters 204 and 206 (the conflicts between these masters in this combined region being deemed acceptable by the system designer).

Figure 4:
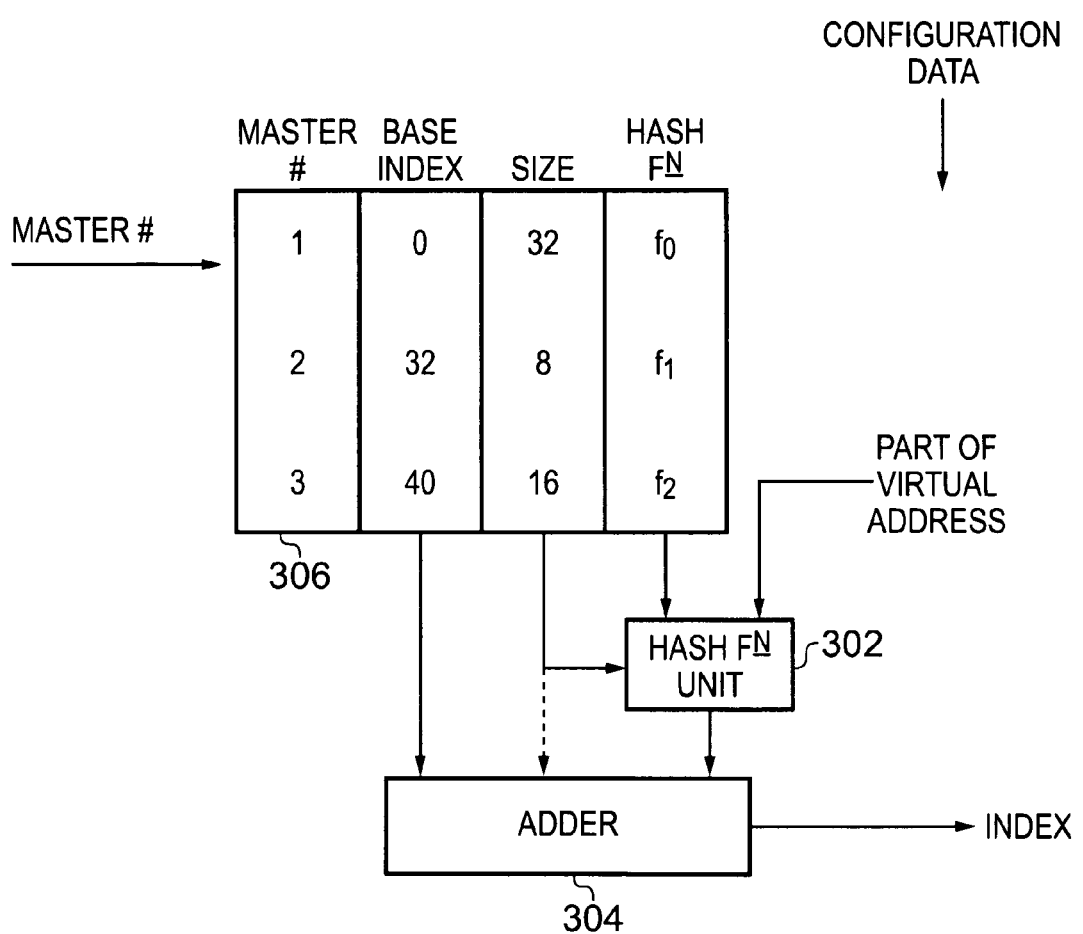
FIG. 4 schematically illustrates a lookup table, hash function unit and adder in the index generation unit in one embodiment.

FIG. 4 schematically illustrates the look up table 306, which receives as its input the identifier of the requesting master device (master #), the adder 304 and the hash function unit 302 The master identifier is used to select the output values of the look up table: base index, size and hash function indicator. The base index is passed to adder 304, which adds the base index to the value output from the hash function unit 302 to form the index. In the illustrated embodiment the size value and the hash function indicator are passed to the hash function unit 302, which uses these inputs to configure how it calculates the hash value from the received part of the virtual address. For example with master #1 as the requesting master, the base index is 0, and the hash function unit uses hash function $f_0$ to hash the virtual address portion to generate a value up to 32, which is then added to 0 to form the index (thus ranging from 0 to 31). Alternatively with master #2 as the requesting master, the base index is 32, and the hash function unit uses hash function $f_1$ to hash the virtual address portion to generate a value up to 8, which is then added to 32 to form the index (thus ranging from 32 to 40). The configuration of the lookup table 306, the hash function unit 302 and the adder 304 can be changed according to the configuration data specified in configuration data register 310. In an alternative configuration, the hash function unit could operate to produce a hash value of fixed length, and the size value could be passed to the adder 304 to configure the manner in which it adds the hash value to the base index to ensure that an index in the specified range is generated.

Figure 5:
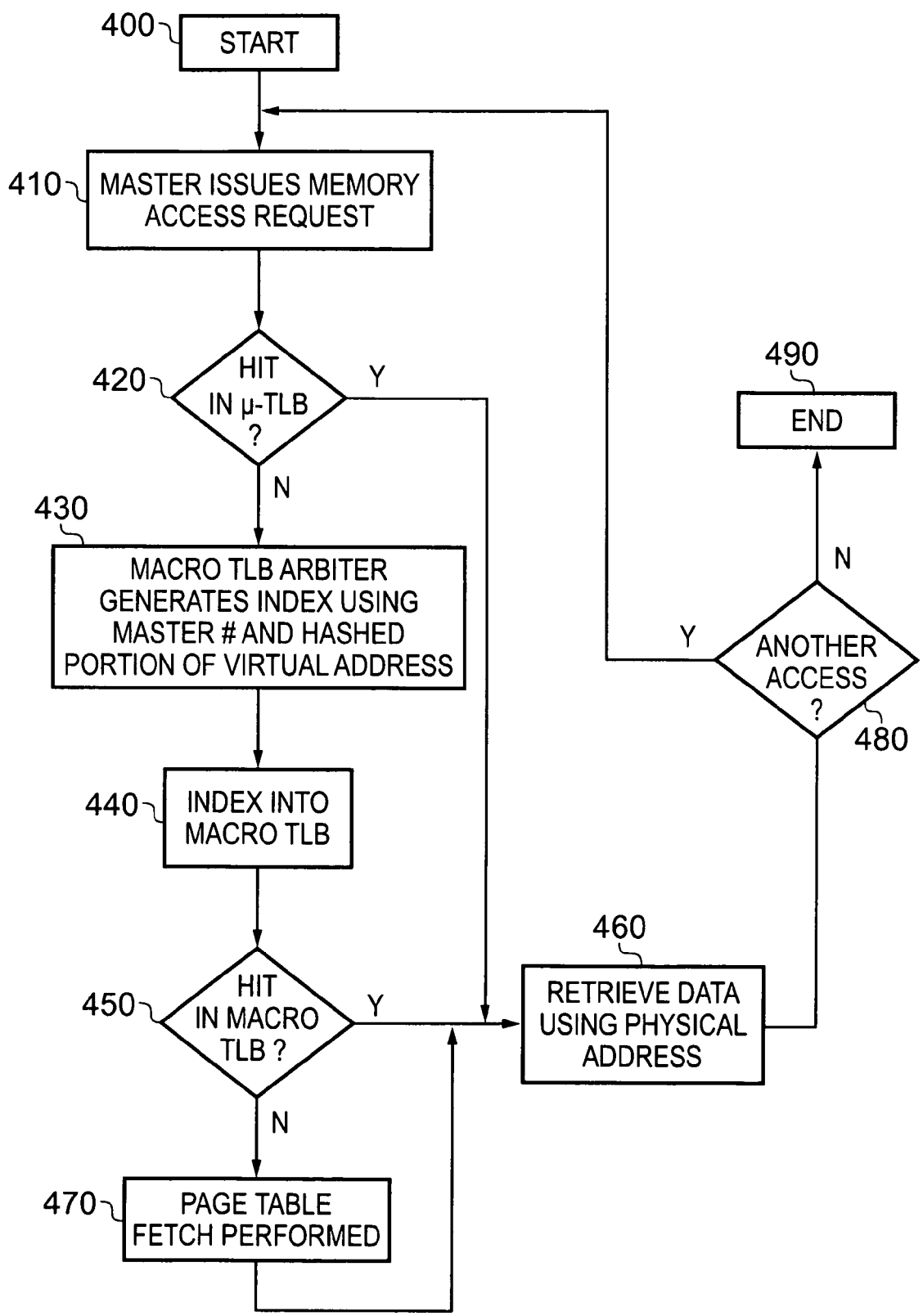
FIG. 5 schematically illustrates a series of steps in the operation of a data processing apparatus of one embodiment.

FIG. 5 schematically illustrates a series of steps taking in a data processing apparatus of one embodiment. The flow begins at step 400 and proceeds to step 410 when a master device issues memory access request. At step 420 it is determined if there is a hit in the micro TLB associated with that master device. If there is, then the flow proceeds directly to step 460 (described below). If there is not, then the access request is handled by the macro TLB arbiter at step 430 which generates an index using its hash function (taking as its input a portion of the virtual address) and the identifier of the requesting master device (master #) to generate an index, which at step 440 is used to select a particular entry of the macro TLB. At step 450 it is determined if there is a hit in the macro TLB, i.e. if the virtual address of the memory access request corresponds to the virtual address portion stored in the selected entry of TLB. If it is not, then the flow proceeds via step 470 at which a replacement entry is retrieved from a page table in memory. Finally, at step 460, the memory access request is carried out using the physical address. At step 480 if another access is to be carried out the flow returns to step 410, otherwise the flow ends at step 490.

Accordingly, a memory management unit may be shared between a plurality of master devices in a data processing apparatus, yet the activities of each master device does not adversely affect the activity of the other master devices.

Although particular example embodiments have been described herein, the claims are not limited thereto, and that many modifications and additions may be made within the scope of the claims.

We claim:

1. A data processing apparatus comprising:
a plurality of master devices configured to issue memory access requests including virtual addresses; and
a memory management unit configured to receive said memory access requests and to translate a virtual address included in a memory access request from a requesting master device into a physical address indicating a storage location in memory, said memory management unit having an internal storage unit having a plurality of entries wherein indications of corresponding virtual address portions and physical address portions are stored, said memory management unit being configured to select a selected entry of said internal storage unit in dependence on said virtual address,
wherein said memory management unit is configured, if a virtual address portion stored in said selected entry does not correspond to said virtual address, to retrieve from a page table stored in memory a replacement entry corresponding to said virtual address,
said memory management unit further comprising an index generation unit configured to generate an index into said internal storage unit to select said selected entry in dependence on said virtual address and an identifier of said requesting master device,
wherein said index generation unit is configured to generate said index into said internal storage unit using a hash function and to generate the same index for a plurality of different inputs, and
wherein said index generation unit is configured to generate said index such that said hash function uses a different number of bits of said virtual address depending on said requesting master device.

2. The data processing apparatus as claimed in claim 1, wherein said index generation unit is configured to generate said index such that at least a subset of said plurality of entries of said internal storage unit are uniquely associated with one of said plurality of master devices.

3. The data processing apparatus as claimed in claim 1, wherein said index generation unit is configured to generate said index such that each entry of said internal storage unit is uniquely associated with one of said plurality of master devices.

4. The data processing apparatus as claimed in claim 1, wherein said index generation unit is comprised within an arbiter unit configured to arbitrate between said memory access requests issued by said plurality of master devices.

5. The data processing apparatus as claimed in claim 1, wherein said index generation unit is configured to generate said index by applying said hash function to at least a portion of said virtual address to generate a first portion of said index, and by using said identifier of said requesting master device to generate a second portion of said index, and by adding said first portion to said second portion to generate said index.

6. The data processing apparatus as claimed in claim 1, wherein said memory management unit is further configured, if said virtual address portion stored in said selected entry does not correspond to said virtual address, to generate a further index into said internal storage unit using a further hash function to reselect said selected entry in dependence on said virtual address and said identifier of said requesting master device.

7. The data processing apparatus as claimed in claim 1, wherein said index generation unit comprises a lookup table configured to store for each identifier a base index, said index being generated in dependence on said base index.

8. The data processing apparatus as claimed in claim 7, wherein said lookup table is further configured to store for each identifier an index range, said index being generated within a range specified by said base index and said index range.

9. The data processing apparatus as claimed in claim 7, wherein said lookup table is further configured to store for each identifier a hash function indicator, said hash function indicator being indicative of said hash function to be used to generate said index.

10. The data processing apparatus as claimed in claim 1, wherein said memory management unit is configured to access said page table using a physical base address stored in a register.

11. The data processing apparatus as claimed in claim 10, wherein said memory management unit is configured to access said page table using a master-specific physical base address stored in a master-specific register associated with said requesting master device.

12. The data processing apparatus as claimed in claim 1, wherein said memory management unit further comprises at least one subset storage unit configured to cache a subset of said entries, wherein if said virtual address corresponds to a virtual address portion cached in said subset, said memory management unit is configured to translate said virtual address into said physical address using a corresponding physical address portion stored in said subset.

13. The data processing apparatus as claimed in claim 12, wherein said at least one subset storage unit is configured to store the most recently used entries of said internal storage unit.

14. The data processing apparatus as claimed in claim 12, wherein said at least one subset storage unit is configured to store up to three entries.

15. The data processing apparatus as claimed in claim 12, wherein said memory management unit comprises at least one subset storage unit for each master device.

16. The data processing apparatus as claimed in claim 15, wherein said memory management unit comprises a subset storage unit associated with a predetermined activity of each master device.

17. The data processing apparatus as claimed in claim 1, wherein said internal storage unit is configured to store said entries in a direct mapped fashion.

18. The data processing apparatus as claimed in claim 1, wherein said internal storage unit is configured to store said entries in a set-associative fashion.

19. The data processing apparatus as claimed in claim 1, wherein said data processing apparatus is a video data processing apparatus.

20. The data processing apparatus as claimed in claim 1, wherein configuration of said index generation unit is predetermined.

21. The data processing apparatus as claimed in claim 1, wherein configuration of said index generation unit is programmable.

22. The data processing apparatus as claimed in claim 21, wherein said index generation unit has at least one register associated therewith for storing configuration data.

23. The data processing apparatus as claimed in claim 1, wherein said internal storage unit is an SRAM device.

24. A data processing apparatus comprising:
a plurality of master device means for issuing memory access requests including virtual addresses; and
a memory management means for receiving said memory access requests and for translating a virtual address included in a memory access request from a requesting master device means into a physical address indicating a storage location in memory, said memory management means having internal storage means having a plurality of entries for storing indications of corresponding virtual address portions and physical address portions, said memory management means being configured to select a selected entry of said internal storage means in dependence on said virtual address,
wherein said memory management means is configured, if a virtual address portion stored in said selected entry does not correspond to said virtual address, to retrieve from a page table stored in memory a replacement entry corresponding to said virtual address,
said memory management means further comprising index generation means for generating an index into said internal storage means to select said selected entry in dependence on said virtual address and an identifier of said requesting master device means,
wherein said index generation means is configured to generate said index into said internal storage unit using a hash function and to generate the same index for a plurality of different inputs, and
wherein said index generation means is configured to generate said index such that said hash function uses a different number of bits of said virtual address depending on said requesting master device.

25. A method of operating a data processing apparatus comprising the steps of:
issuing memory access requests including virtual addresses from a plurality of master devices;
receiving said memory access requests at a memory management unit;
translating a virtual address included in a memory access request from a requesting master device into a physical address indicating a storage location in memory, said memory management unit having an internal storage unit having a plurality of entries wherein indications of corresponding virtual address portions and physical address portions are stored;
selecting a selected entry of said internal storage unit in dependence on said virtual address, wherein, if a virtual address portion stored in said selected entry does not correspond to said virtual address, retrieving from a page table stored in memory a replacement entry corresponding to said virtual address; and
generating, using a hash function, an index into said internal storage unit to select said selected entry in dependence on said virtual address and an identifier of said requesting master device and to generate the same index for a plurality of different inputs,
wherein said hash function uses a different number of bits of said virtual address depending on said requesting master device.

* * * * *